United States Patent
Kuehnle et al.

(10) Patent No.: US 9,637,064 B1
(45) Date of Patent: May 2, 2017

(54) APPARATUS AND METHOD FOR RESTORING A CAMERA MOUNTING TO A CALIBRATED POSITION

(71) Applicant: Bendix Commercial Vehicle Systems LLC, Elyria, OH (US)

(72) Inventors: Andreas U Kuehnle, Villa Park, CA (US); Marton G Gyori, Budapest (HU); Hans M Molin, Mission Viejo, CA (US); Thomas S Legeza, Olmsted Township, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 14/882,776

(22) Filed: Oct. 14, 2015

(51) Int. Cl.
*B60R 11/04* (2006.01)
*G03B 17/56* (2006.01)
*H04N 5/225* (2006.01)
*B60R 11/00* (2006.01)

(52) U.S. Cl.
CPC ............ *B60R 11/04* (2013.01); *G03B 17/561* (2013.01); *H04N 5/2252* (2013.01); *H04N 5/2253* (2013.01); *B60R 2011/004* (2013.01); *B60R 2011/0059* (2013.01)

(58) Field of Classification Search
USPC ......................................................... 396/428
See application file for complete search history.

(56) References Cited

U.S. PATENT DOCUMENTS

| | | | |
|---|---|---|---|
| 4,244,140 A | 1/1981 | Kim | |
| 4,658,335 A | 4/1987 | Culler | |
| 5,876,005 A * | 3/1999 | Vasconi | F16M 11/10 |
| | | | 248/276.1 |
| 6,364,496 B1 * | 4/2002 | Boddy | B60R 1/072 |
| | | | 248/476 |

(Continued)

FOREIGN PATENT DOCUMENTS

| | | |
|---|---|---|
| EP | 1243793 A2 | 9/2002 |
| EP | 1251381 A2 | 10/2002 |

(Continued)

OTHER PUBLICATIONS

Johnson Matthey, "Nitinol Shape Setting," webpage, http://jmmedical.com/resources/251/Nitinol-Shape-Setting.html, printed Aug. 21, 2015, Johnson Matthey Medical Components.

(Continued)

*Primary Examiner* — Clayton E LaBalle
*Assistant Examiner* — Linda B Smith
(74) *Attorney, Agent, or Firm* — Cheryl L. Greenly; Brian E. Kondas; Eugene E. Clair

(57) ABSTRACT

Various examples of an apparatus for mounting a camera on a vehicle are disclosed. An apparatus comprises a first portion of a first material with a first end configured for attaching to a camera and a second end configured for mounting to a vehicle. The apparatus is configured to maintain the camera in a substantially calibrated position. A second portion of a second material is coupled to the first portion, wherein the second material is capable of deforming (Continued)

upon an impact to the apparatus and returning the apparatus to the calibrated position upon exposure to an energy source. In another example, the apparatus is constructed entirely of the second material.

19 Claims, 5 Drawing Sheets

(56) References Cited

U.S. PATENT DOCUMENTS

| | | |
|---|---|---|
| 6,762,790 B1 | 7/2004 | Matko |
| 6,931,340 B2 | 8/2005 | Jackson |
| 7,744,058 B2 * | 6/2010 | Clark ............... F02C 9/16 251/11 |
| 8,243,138 B2 | 8/2012 | Yamamoto |
| 8,267,216 B2 | 9/2012 | Browne |
| 8,502,860 B2 | 8/2013 | Demirdjian |
| 8,864,392 B2 | 10/2014 | Alexander |
| 2004/0211177 A1 * | 10/2004 | Kutlucinar ............ F03G 7/065 60/527 |
| 2005/0030418 A1 * | 2/2005 | Hoffman ............ H04N 5/2252 348/373 |
| 2005/0141997 A1 | 6/2005 | Rast |
| 2006/0268439 A1 | 11/2006 | Butera |
| 2008/0049344 A1 | 2/2008 | DeWard |
| 2009/0278342 A1 | 11/2009 | Browne |
| 2010/0027119 A1 | 2/2010 | Kollar |
| 2011/0083325 A1 | 4/2011 | Foley |
| 2012/0187261 A1 | 7/2012 | Cicero |
| 2013/0182176 A1 * | 7/2013 | Honda ............... H04N 5/2251 348/360 |
| 2014/0211010 A1 | 7/2014 | Alexander |
| 2014/0313335 A1 | 10/2014 | Koravadi |

FOREIGN PATENT DOCUMENTS

| | | |
|---|---|---|
| EP | 2543545 A1 | 1/2013 |
| JP | S58214432 A | 12/1983 |
| JP | H0911794 A | 1/1997 |
| JP | H0723077 B2 | 3/1999 |
| JP | H11115630 A | 4/1999 |
| WO | WO2014/057423 A2 | 4/2014 |

OTHER PUBLICATIONS

Silicon Micro Sensor GmbH, SMS-9999-04-02 "Blue Eagle Digital Camera Line DC3K," catalog, May 26, 2014, p. 1, Silicon Micro Sensor GmbH, Dresden, Germany.

* cited by examiner

APPARATUS AND METHOD FOR RESTORING A CAMERA MOUNTING TO A CALIBRATED POSITION

BACKGROUND

The present invention relates to examples of an apparatus and method for restoring a camera mounting to a calibrated position. Cameras are prevalent on commercial vehicles for providing back-up viewing, surround vehicle viewing and object detection. Cameras are generally mounted external to the vehicle to provide optimal views. To provide a precise view as required for proper system operation, the cameras are placed on a fixed bracket external to the vehicle. In one example, the bracket is adjusted to a calibrated position. In another example the position of the bracket is fixed, the camera learns the fixed position and the camera is calibrated to that position. During driving situations, the camera and its fixed bracket may be exposed to impact, which may move the camera out of its original calibrated position. If the camera is out of the calibrated position, the view provided to the object detection system and/or to the driver is out of alignment. Particular areas around the vehicle may no longer be under surveillance of a camera when it is out of the calibrated position and system performance may suffer. Therefore, there is a need for a way to restore the camera mounting to its calibration position.

SUMMARY

Various examples of an apparatus for mounting a camera on a vehicle are disclosed. An apparatus comprises a first portion of a first material with a first end configured for attaching to a camera and a second end configured for mounting to a vehicle. The apparatus is configured to maintain the camera in a calibrated position. A second portion of a second material is coupled to the first portion, wherein the second material is capable of deforming upon an impact to the apparatus and returning the apparatus to the calibrated position upon exposure to an energy source.

Various examples of an assembly for a camera mounting are disclosed. The assembly comprises a camera and a bracket comprising a first portion with an end for fastening to the camera. The bracket includes a second portion coupled to the first portion with a shape memory material in a first form. The second portion is capable of deforming upon an impact to the apparatus and reforming to the first form upon exposure to an energy source.

An example of a method of configuring a camera assembly for a vehicle is disclosed. The method comprises fastening a camera on a first end of a bracket and fastening a second end of the bracket to a vehicle. The bracket comprises a portion between the first end and the second end with a shape memory material in a predetermined form. The method includes calibrating the camera assembly, determining the camera assembly is no longer in the calibrated position and exposing the shape memory material to an energy source such that the shape memory material returns to the predetermined form.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
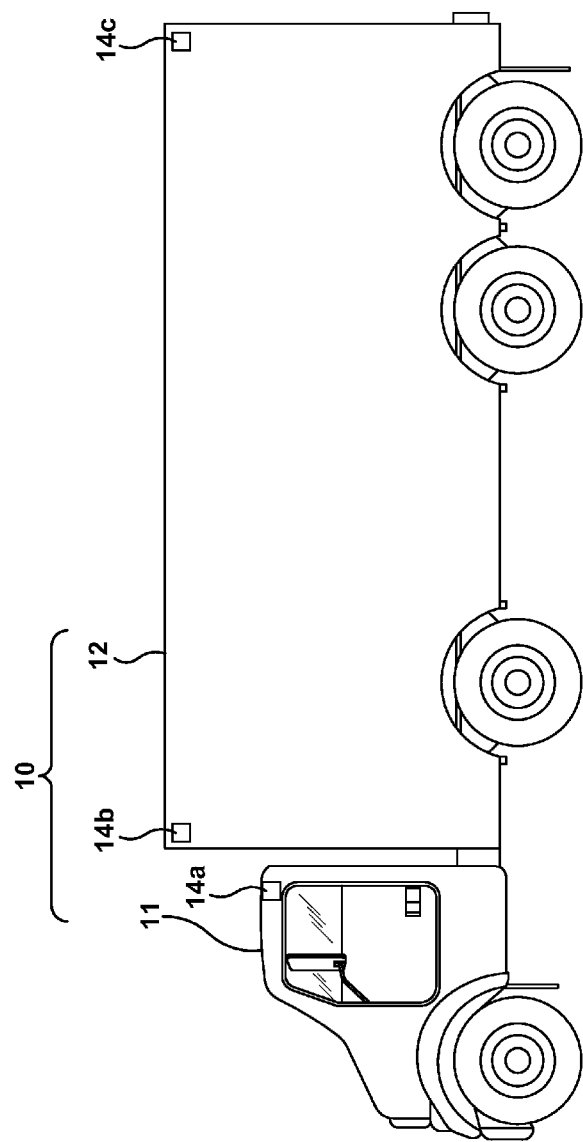
FIG. 1 illustrates a schematic representation of commercial vehicle equipped with cameras on the tractor and trailer according to an example of this invention.

With reference to FIG. 1, a commercial vehicle 10 is shown. The commercial vehicle 10 includes a tractor 11 and a trailer 12. The tractor 11 includes a camera assembly 14a. The trailer 12 includes a first camera assembly 14b and a second camera assembly 14c. There may be more or fewer camera assemblies on each portion of the commercial vehicle 10.

Each camera assembly 14a, 14b, 14c is placed relatively high on the structure of the commercial vehicle 10 in order to obtain a view around the commercial vehicle 10. As will be explained, each of the camera assemblies 14a, 14b, 14c are calibrated when installed to maintain a view of the area around the commercial vehicle 10. The camera assemblies 14a, 14b, 14c may be part of an imaging system, such as used for vehicle back up alarms, object detection or surround view.

The camera assemblies 14a, 14b, 14c extend beyond the profile of the tractor 11 and trailer 12. As such, the camera assemblies 14a, 14b, 14c are more likely to be exposed to impact with objects, such as tree limbs, signs and garage entryways, while the commercial vehicle 10 is in service. Impact to a camera assembly is detrimental because, for example, a surround view system relies on a precise geometric relationship among the views provided by each camera assembly around the vehicle. If the relationship among the camera views is changed due to an impact to one of the camera assemblies, there will be artifacts in the surround view image and the imaging system's ability to interpret objects in the image will be deleteriously affected.

Each of the camera assemblies 14a, 14b, 14c includes a camera. The cameras 14a, 14b, 14c may be of the same type, for example the Blue Eagle digital camera from Silicon Micro Sensor GmbH. Each of the camera assemblies 14a, 14b, 14c includes a bracket to affix the camera to the tractor 11 or trailer 12, as will be described.

Figure 2:
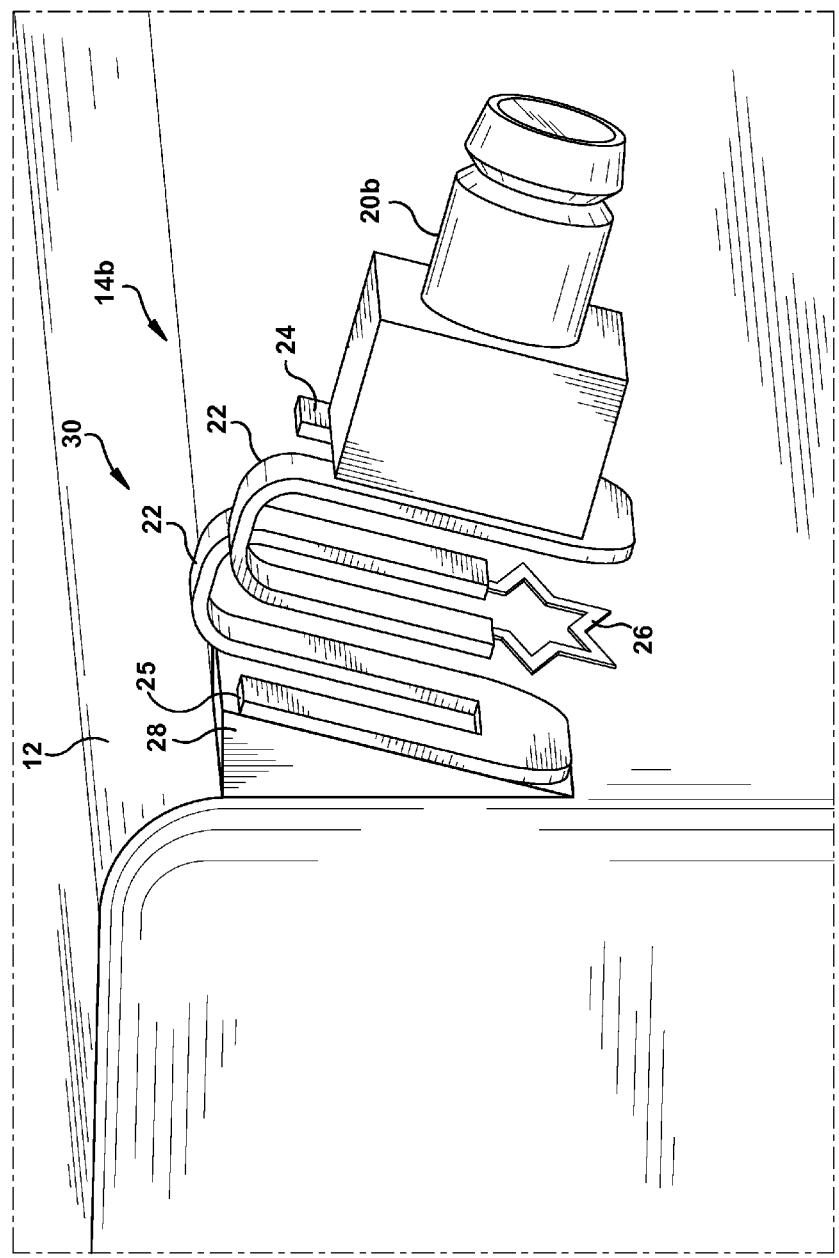
FIG. 2 illustrates a camera assembly with a bracket according to an example of the present invention.

With reference to FIG. 2, assembly 14b as affixed to the trailer 12 includes a camera 20b. The camera 20b is shown affixed to a bracket 30 on a side of trailer 12. The bracket 30 maintains the camera 20b in a substantially stable position during normal operation of the commercial vehicle 10. The imaging system with camera 20b is generally calibrated after the camera 20b is installed on the vehicle and no adjustments would be made to the bracket 30.

The bracket 30 includes a first portion 22 with a first end 24 configured for receiving the camera 20b. The camera 20b can be fastened to the first end 24 by mechanical fasteners, adhesives or other means. The first portion 22 includes a second end 25 configured for affixing to the trailer 12. The second end 25 of the bracket 30 may optionally be attached to a base portion 28, which is then affixed to the trailer 12.

The first portion 22 may be a rigid material, such as steel, aluminum or industrial plastic.

The bracket 30 includes a second portion 26, which separates the first end 24 and the second end 25 of the first portion 22. In one example, the second portion 26 is in at the approximate midpoint between the first end 24 and the second end 25. In another example, the second portion 26 is a different shape than the first portion 22. The structure of the second portion 26 is such that it is isotropically weakened or selectively directionally weakened. Any impact to the camera assembly 14b will cause deflection or deformation at the weaker second portion 26 prior to causing any deformation to the first portion 22. In the example in FIG. 2, the shape of the second portion 26 is a folded or spring shape. The shape of the first portion 22 may be an S-shaped curve. The shape of the second portion 26 may be that of a three dimensional space-filling curve, where there is not a single direction of the second portion 26 that is stronger than any other direction.

The second portion 26 comprises a material different than the first portion 22. The material of the second portion 26 can be a shape memory alloy, such as Nitinol or similar material. The shape memory alloy is first set in a custom predetermined form, such as the shape shown in FIG. 2. Shape setting is accomplished by constraining the shape memory material in the desired position and applying an energy source, such as heat or electricity. Because of the expense of the shape memory material, the section of the bracket 30 of the second portion 26 may be shorter than the section of the bracket 30 comprising the first portion 22. In one example, the second portion 26 is less than 10% of the overall length of the bracket 30.

Shape memory alloys exhibit characteristics wherein a shape is set into the material at a low temperature and the shape memory alloy will return to the set shape upon exposure to a high temperature. The shape memory alloy section is made weaker than the material of the first portion 22 of bracket 30 by virtue of its form and dimensions. Upon impact to any point on the camera assembly 14b, the view of camera 20b may be shifted and no longer be in its calibrated position. The shape memory alloy portion 26 has a yield strength less than the first portion 22 so that the second portion 26 preferentially deforms before the first portion 22. For example, the yield force of the second portion 26 may be between about 10 pounds and 20 pounds force. Deformation to the second portion 26 can be corrected using the method described herein, since a shape memory alloy returns to its original shape when exposed to an energy source, such as heat. However, since a heat source may be above 100 C, for example, it is advantageous if the camera 20b is protected by a heat shield element (not shown). The camera 20b is then returned to its original calibrated position. Therefore, the entire bracket 30 would not have to be replaced after impact nor would the imaging system and camera 20b require an extensive recalibration to ensure the camera 20b is in the correct position.

In another example, the first portion 22 located closest to the second portion 26 and the second portion 26 would be coated, with epoxy paint for example. If the bracket 30 were subject to deformation, the paint would craze, crack or flake. The crazing, cracking or flaking gives the driver a visual means to determine that the bracket 30 has been moved out of its calibrated position.

In another example, the second portion 26 of the bracket 30 may be a standardized shape. The second portion 26 of the bracket 30 would be replaceable so that if the shape memory material could not return to its original predetermined form, the second portion 26 could be substituted with a new bracket portion.

Figure 3:
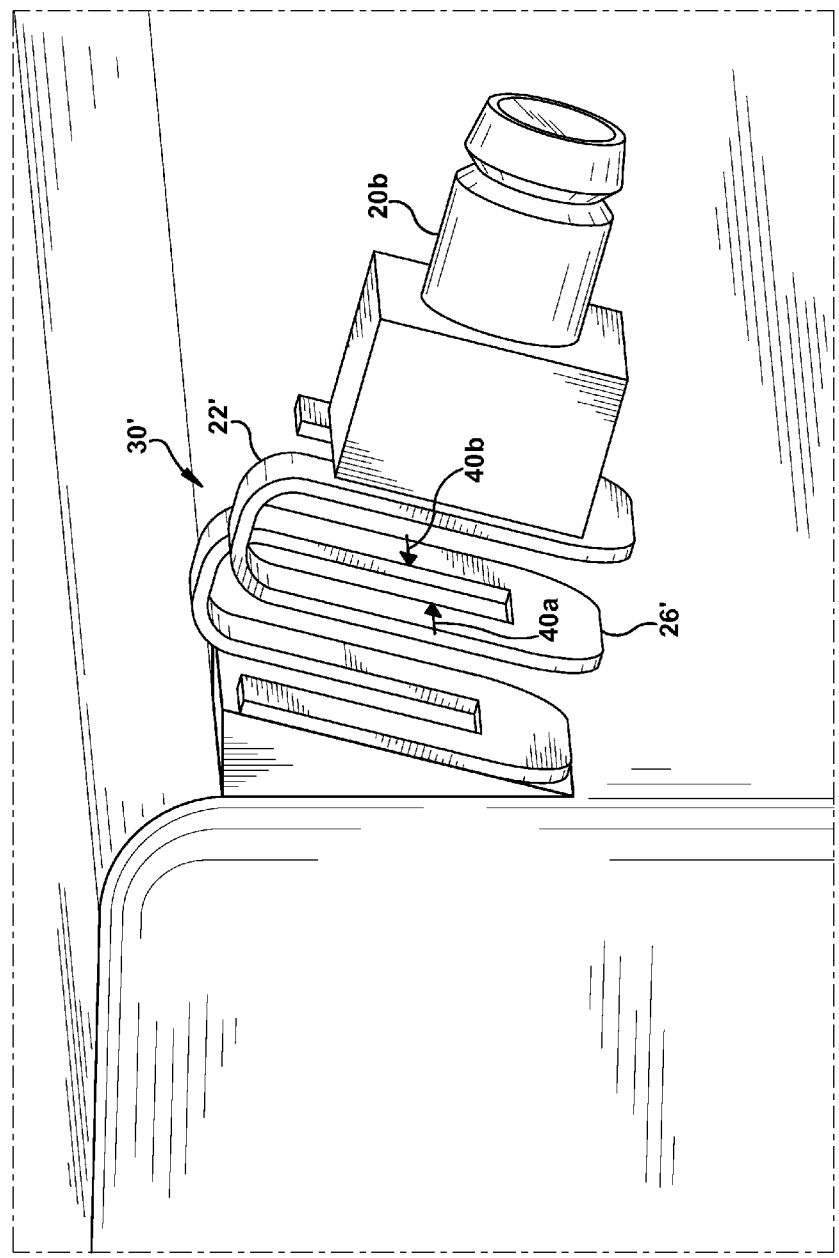
FIG. 3 illustrates a camera assembly according to another example of the present invention.

FIG. 3 illustrates another example of a camera assembly 14b. In this example, the first portion 22' and the second portion 26' of the bracket 30' are a single piece made of the same material. The material may be shape memory material, such as Nitinol. In this example, the first portion 22' and the second portion 26' are in a predetermined shape of two S-curves in non-coincident planes. In case of impact to the camera assembly 30', the entire bracket 30' will be deformed and the entire bracket 30' would need to be subject to the energy source to be reformed to the predetermined shape.

The bracket 30' of FIG. 3 also includes an indicator means. The bracket 30' includes an indicator feature 40a on the first portion 22' and an indicator feature 40b aligned with the indicator feature 40a on another section of the first portion 22. The indicator feature 40a can be an arrow that would be in alignment with the indicator feature 40b arrow when the bracket 30' is in the calibrated position.

As shown in FIG. 3, the indicator feature 40a is not in alignment with indicator feature 40b. In this example, a driver or a technician for the commercial vehicle 10 could see that the bracket 30' has likely sustained an impact, causing the indicators features 40a, 40b to be out of alignment. The technician could then use the method described herein to reform the bracket 30' to its calibrated position.

In another example, the bracket 30' would be within the view of another camera on the vehicle 10, such as camera 20c. Camera 20c would determine that the camera 20b is out of alignment by recognizing during image processing of bracket 30' that indicator feature 40a is out of alignment with indicator feature 40b. The imaging system could then provide an electronic indicator, such as a lamp, to the driver to let him know that the bracket 30' out of alignment.

In another example, the first portion 22' and the second portion 26' would be coated, with epoxy paint for example. If the bracket 30' were subject to deformation, the coating would craze, crack or flake; thereby providing the driver another visual means to determine that the bracket 30' has been moved out of its calibrated position. In another example, a more compliant or adhesive coating of a second contrasting color would be coated directly on the bracket 30'. The more craze prone coating would be added over the more compliant coating. When the top layer of craze prone coating crazes, cracks or flakes, the second color coating would be visible, making it easier to see that the bracket 30' had deformed.

Another method to determine that the bracket 30' is no longer in the calibrated position is that the field of view of the camera 20b changes after impact. The imaging system can then indicate to the driver or technician that the camera 20b is no longer in the calibrated position.

Figure 4:
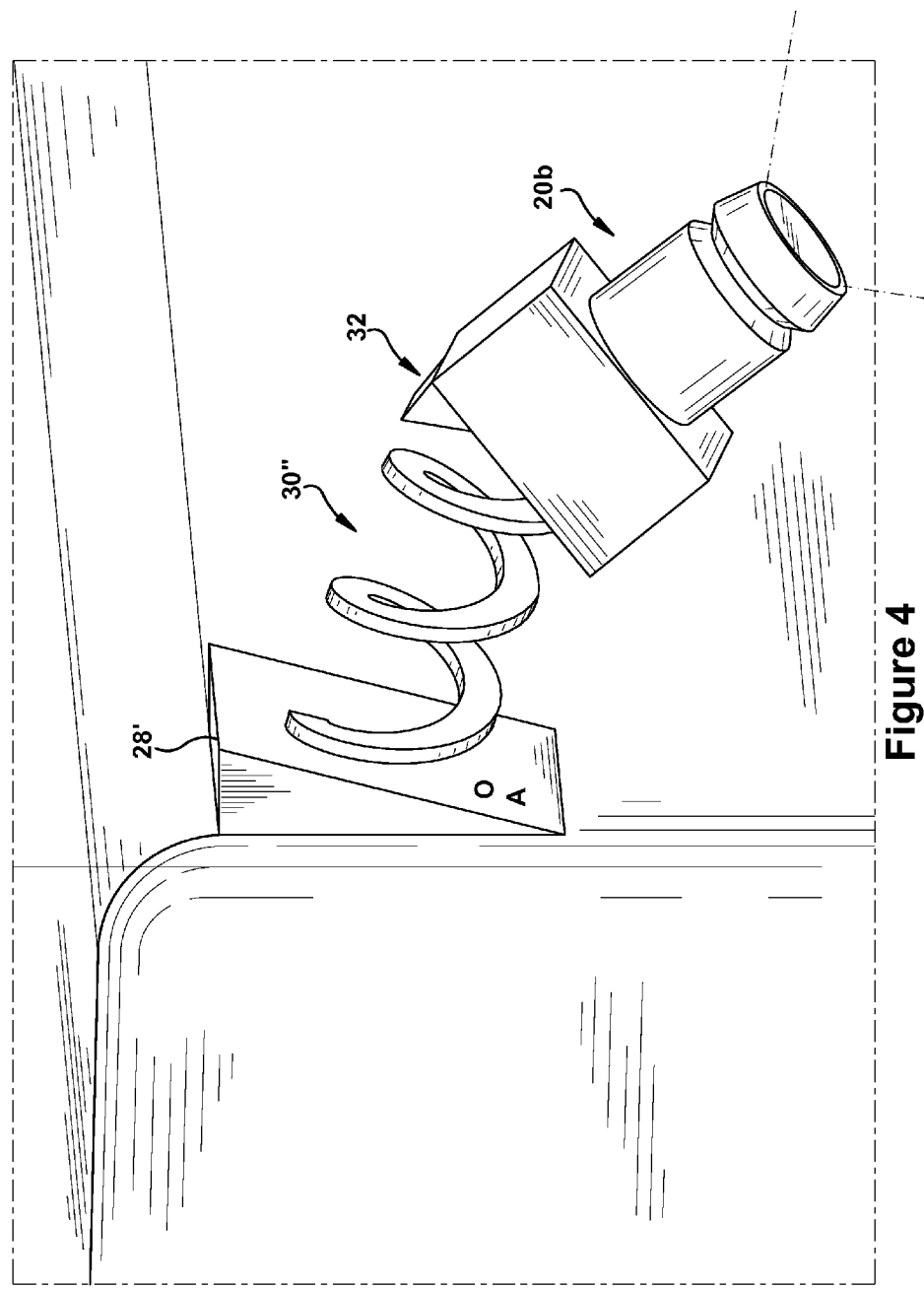
FIG. 4 illustrates a camera assembly according to another example of the present invention.

FIG. 4 illustrates another example of camera 20b and bracket 30". In this example, the entire bracket 30" is made of a shape memory material. The bracket 30" is mounted to a base 28". In this example, the bracket 30" is shaped in a helical shape or twisted ribbon shape. In this shape, the bulk of any impact will be absorbed by the bracket 30".

Optionally, the camera 20b includes an aiming device 32. The aiming device 32 is calibrated to view a particular point A on the base 28". If the aiming device 32 no longer sees point A on base 28", the imaging system can automatically determine that the camera 20b is no longer in the calibrated position. The aiming device 32 may be another camera. The aiming device 32 may be a light transmitting device. Point A may be a reflective device so that the aiming device 32 determines the camera 20*b* is in the calibrated position as long as the aiming device 32 is receiving a reflection. If the camera 20*b* receives an impact and the bracket 30" is moved out of the calibrated position, then the light beam would no longer be reflected from Point A.

Figure 5:
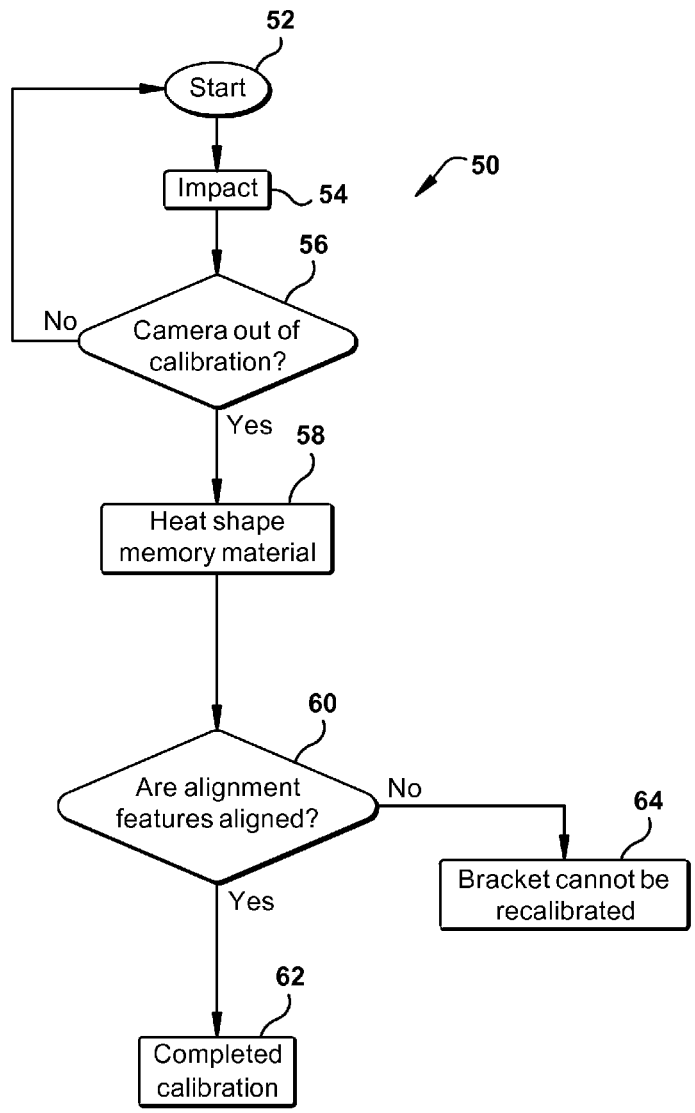
FIG. 5 illustrates a method of restoring a camera bracket to a calibrated position.

FIG. 5 illustrates a flowchart for implementing a method 50 of calibrating the camera assembly, such as camera assembly 14*b*. The method 50 begins at step 52.

In step 54, the camera assembly 14*b* receives an impact, which could be from a tree while the vehicle 10 is traveling down the road, for example. The camera assembly 14*b* may be forcibly moved out of its calibrated position by means of this external force. If the force is greater than the yield strength of the second portion 26 of the bracket 30, the second portion 26 made of the shape memory alloy is plastically deformed. For example, the yield force of the second portion 26 may be between about 10 pounds and 20 pounds force. This yield force is less than the first portion 22 of the bracket 30.

The camera 20*b* is determined to be out of calibration in step 56, either by the visual alignment means or the coating means as described above. If the camera 20*b* is out of calibration, the method 50 continues to step 58. If it is determined that the camera 20*b* is not out of calibration, the method returns to step 52.

If the camera is out of calibration, the next step 58 is to heat the second portion 26 of the bracket 30. Since the heat must be above 100 C, for example, it is advantageous if the camera 20*b* is protected by a heat shield element. The heat can be applied in step 58 by direct forced air or electric means. A vehicle technician can apply the heat to the bracket 30.

In step 60, it must be determined if the camera 20*b* is still out of calibration. The visual alignment means can be used in this instance, such that the heat applied by the vehicle technician can cease when he can view that the alignment features 40*a*, 40*b* are realigned. The automatic alignment using the optical method described above may also be used. If the features are realigned, the method moves to step 62, where the calibration is completed.

If the features are not realigned, it is determined that the bracket cannot be recalibrated in step 64. In this instance, an entirely new bracket 30 may need to be placed on the vehicle. In some instances, the impact to the bracket may have exceeded the yield strength of the first portion 22 of the bracket 30.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An apparatus for mounting a camera on a vehicle comprising:
    a first portion of a first material with a first end configured for attaching to a camera and a second end configured for mounting to a vehicle, wherein the apparatus is configured to maintain the camera in a calibrated position; and
    a second portion of a second material coupled to the first portion, wherein the second portion is a selectively weakened form so that the second portion deforms prior to the first portion in response to an impact, wherein the second material is capable of:
       deforming upon an impact to the apparatus; and
       returning the camera to the calibrated position upon exposure to an energy source.

2. The apparatus as in claim 1, wherein the second material is a shape memory metal.

3. The apparatus as in claim 1, wherein the second portion is less than 10% of a length of the first portion.

4. The apparatus as in claim 2, wherein the first material is the same as the second material.

5. The apparatus as in claim 4, wherein the first portion and the second portion are in a shape of one of two S-curves in non-coincident planes, a twisted ribbon and a three dimensional space-filling curve.

6. An apparatus for mounting a camera on a vehicle comprising:
    a first portion of a first material with a first end configured for attaching to a camera and a second end configured for mounting to a vehicle, wherein the apparatus is configured to maintain the camera in a calibrated position; and
    a second portion of a second material coupled to the first portion, wherein the second portion is coated and the coating visibly crazes in response to an impact; wherein the second material is capable of:
       deforming upon the impact to the apparatus; and
       returning the camera to the calibrated position upon exposure to an energy source.

7. An apparatus for mounting a camera on a vehicle comprising:
    a first portion of a first material with a first end configured for attaching to a camera and a second end configured for mounting to a vehicle, wherein the apparatus is configured to maintain the camera in a calibrated position; and
    a second portion of a second material coupled to the first portion, wherein the first portion includes a first feature that aligns with a second feature on the second portion; wherein the first feature and second feature are not aligned in response to an impact wherein the second material is capable of:
       deforming upon the impact to the apparatus; and
       returning the camera to the calibrated position upon exposure to an energy source.

8. The apparatus as in claim 7, wherein the first feature is an arrow and the second feature is an arrow.

9. An assembly for a camera mounting comprising
    a camera;
    a bracket comprising:
    a first portion with a first end for fastening to the camera and a second end for mounting to a vehicle;
    a second portion in a predetermined form coupled to the first portion, wherein the second portion is a selectively weakened form so that the second portion deforms prior to the first portion in response to an impact; wherein the second portion is capable of:
       deforming upon the impact to the apparatus; and
       returning to the predetermined form upon exposure to an energy source.

10. The assembly as in claim 9, wherein the first portion is a rigid material and the second portion is a yielding material.

11. The assembly as in claim 9, wherein a field of view of the camera changes in response to the impact.

12. The assembly as in claim 9, wherein the second portion is coated and deformation of the second portion is determined when the coating is crazed.

13. The assembly as in claim 9, further comprising: a shield for protecting the camera from the energy exposure during the reforming of the second portion.

14. The assembly as in claim 9, wherein the second portion is a shape memory metal.

15. The assembly as in claim 14, wherein the first portion is the same material as the second portion.

16. The assembly as in claim 15, wherein the first portion and the second portion are in a shape of one of two S-curves in non-coincident planes, a twisted ribbon and a three dimensional space-filling curve.

17. A method of configuring a camera assembly for a vehicle comprising:
fastening a camera on a first end of a bracket;
affixing a second end of the bracket to a vehicle; wherein the bracket comprises a portion between the first end and the second end with a shape memory material in a predetermined form;
calibrating the camera based on the fastened position of the camera;
determining the camera is no longer in the calibrated position in response to the shape memory material no longer being in the predetermined form; and
exposing the shape memory material to an energy source such that the shape memory material returns to the predetermined form.

18. The method as in claim 17, wherein determining the camera is no longer in the calibrated position comprises an optical method of viewing the alignment of the first end of the bracket with respect to the second end of the bracket.

19. The method as in claim 17, further comprising: impacting the camera assembly; wherein the shape memory material is preferentially deformed in response to the impact.

* * * * *